(12) United States Patent
Pratt

(10) Patent No.: US 6,502,086 B2
(45) Date of Patent: Dec. 31, 2002

(54) MAPPING BINARY OBJECTS IN EXTENDED RELATIONAL DATABASE MANAGEMENT SYSTEMS WITH RELATIONAL REGISTRY

(75) Inventor: Robert C. Pratt, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,108

(22) Filed: Jan. 4, 1999

(65) Prior Publication Data

US 2001/0049693 A1 Dec. 6, 2001

(51) Int. Cl.$^7$ .............................................. G06F 17/30
(52) U.S. Cl. ........................ 707/1; 707/201; 707/101.1; 707/10
(58) Field of Search .............................. 707/10, 205, 1, 707/2, 101.1, 201; 340/172.5; 703/103; 600/508

(56) References Cited

U.S. PATENT DOCUMENTS

| | | | | |
|---|---|---|---|---|
| 3,670,310 A | * | 6/1972 | Bharwani et al. | 340/172.5 |
| 5,263,167 A | | 11/1993 | Conner, Jr. et al. | |
| 5,295,256 A | | 3/1994 | Bapat | |
| 5,426,780 A | | 6/1995 | Gerull et al. | |
| 5,499,371 A | | 3/1996 | Henninger et al. | |
| 5,682,524 A | * | 10/1997 | Freund et al. | 395/605 |
| 5,689,698 A | | 11/1997 | Jones et al. | |
| 5,694,598 A | | 12/1997 | Durand et al. | |
| 5,706,506 A | | 1/1998 | Jensen et al. | |
| 5,732,402 A | * | 3/1998 | Lehman | 707/205 |
| 5,778,378 A | * | 7/1998 | Rubin | 707/103 |
| 5,826,253 A | * | 10/1998 | Bredenberg | 707/2 |
| 5,918,224 A | * | 6/1999 | Bredenberg | 707/2 |
| 5,983,213 A | * | 11/1999 | Nakano et al. | 707/1 |
| 6,004,276 A | * | 12/1999 | Wright et al. | 600/508 |
| 6,065,013 A | * | 5/2000 | Fuh et al. | 707/103 |

FOREIGN PATENT DOCUMENTS

EP          0 336 580          10/1989

* cited by examiner

Primary Examiner—Hosain T. Alam
Assistant Examiner—Tam V Nguyen
(74) Attorney, Agent, or Firm—McGinn & Gibb, PLLC; Richard M. Kotulak, Esq.

(57) ABSTRACT

An automated data processing system includes a relational database engine, storage devices having a database table, registry and binary large objects created and updated by the relational database engine and a user defined function engine retrieving data elements stored in the binary large objects. The registry includes data element classifications. The database table includes relational information of the data elements, the data element classifications and pointers to the binary large objects, and the relational database engine creates and updates the binary large objects based on the database table and the registry.

26 Claims, 7 Drawing Sheets

Sample DB2 Table

Objects in File System

| Regid | RegVers | RecType | Position | ElementName |
|---|---|---|---|---|
| R0001 | 1 | 10 | 1 | Element1 |
| R0001 | 1 | 10 | 2 | Element2 |
| R0001 | 1 | 10 | 3 | Element3 |
| R0001 | 1 | 20 | 1 | Element4 |
| R0001 | 1 | 20 | 2 | Element5 |

DataElement Table

| RecType | ElementLength | MaxElements | |
|---|---|---|---|
| 10 | 4 | 500 | <<< Floating Point Values |
| 20 | 2 | 10 | <<< Short Integers |

RecType Table

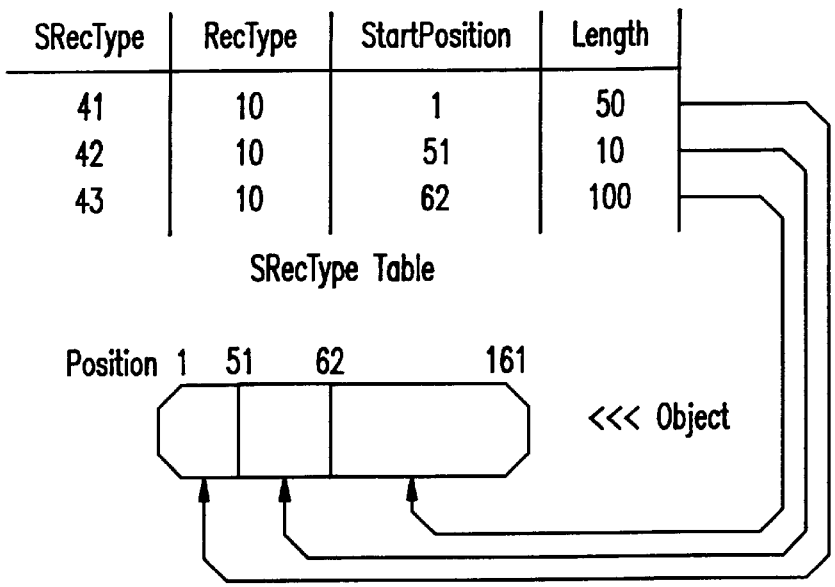
FIG. 3A
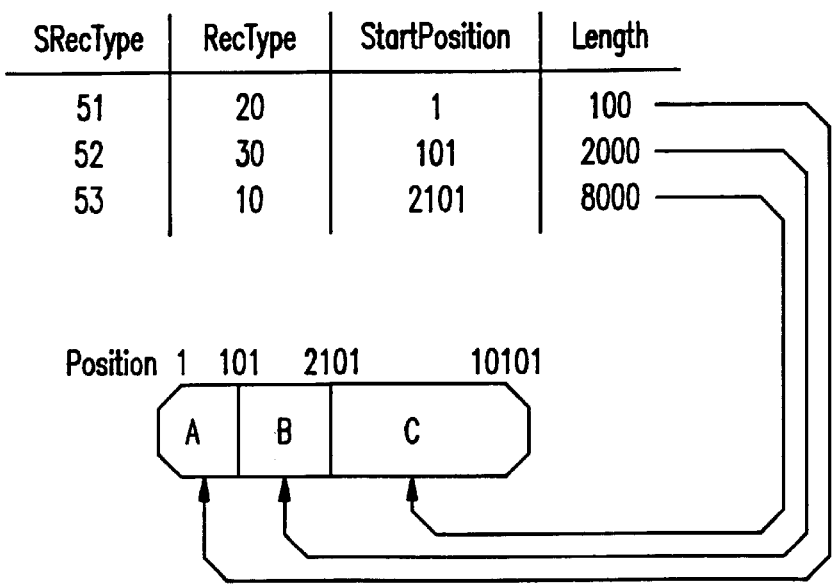
FIG. 3B
| SRecType | ElementLength | MaxElements | Description |
|---|---|---|---|
| 51 | 4 | 25 | Integers |
| 52 | 2000 | 1 | String |
| 53 | 4 | 2000 | Floating Point Values |
FIG. 3C

| Regid | RegVers | RecType | Position | ElementName |
|---|---|---|---|---|
| R0001 | 1 | 20 | 1 | Integer1 |
| R0001 | 1 | 20 | 2 | Integer2 |
| R0001 | 1 | 20 | 3 | Integer3 |
| R0001 | 1 | 20 | ... | Integer(n) |
| R0001 | 1 | 20 | 25 | Integer25 |
| R0001 | 1 | 30 | 100 | String1 |
| R0001 | 1 | 10 | 2100 | Float1 |
| R0001 | 1 | 10 | 2104 | Float2 |
| R0001 | 1 | 10 | ... | Float(n) |
| R0001 | 1 | 10 | 10096 | Float2000 |

FIG.4A

| RecType | ElementLength | MaxElements | Description |
|---|---|---|---|
| 10 | 4 | 2000 | Floating Point Values |
| 20 | 2 | 10 | Integer |
| 30 | 2000 | 1 | String |

FIG.4B

| RecType | ElementLength | MaxElements |
|---|---|---|
| 30 | 1 | 2000 |

FIG.4C

MAPPING BINARY OBJECTS IN EXTENDED RELATIONAL DATABASE MANAGEMENT SYSTEMS WITH RELATIONAL REGISTRY

BACKGROUND OF THE INVENTION

1. Field of the Invention

The present invention generally relates to databases and more particularly to a relational database which utilizes binary large objects and an object registry table in lieu of conventional data columns.

2. Description of the Related Art

Databases are highly useful for organizing many types of information. For example, production items can be tested and the test information stored in a database. The semiconductor manufacturing environment is characterized by numerous part numbers running in the fabricator at the same time. While all of these parts typically belong to the same product technology group, they all differ in some way. This leads to the need for different test requirements for all products.

Conventional systems have different test requirements that translate into different storage requirements for a database system. More specifically, one product may test N parameters while another tests M parameters. The situation becomes more complex when the contents of N are not the same as the contents of M. If one parameter is different, then there are M+1 different parameters that need to be accounted for in the database. Taking this progression out to K parts, there could be M*K different parameters that require storage.

In a classical relational model, this would require tables with M*K columns. This quickly becomes unmanageable and extends beyond the capabilities of conventional relational database management systems.

An additional problem of conventional relational database systems is the utilization factor associated with each row of the data table. If a row is only using 1/10 of the columns defined, then that row has a utilization factor of 0.1(M*K). There is a 90% waste of space in this row. This problem becomes severe as products mature and testing is reduced. The tables cannot change and thus the utilization factor goes down and the waste goes up.

This problem has been addressed before through different approaches. The 100% object oriented approach uses an object oriented database technology, where the collections of test values are stored as objects. In this system each test measurement is treated as an object. Measurement objects inherit from chip objects, which inherit from wafer objects, which inherit from lot objects. This creates an object inheritance structure where the lot is at the top and the test measurement is at the bottom. In such a conventional system all information about the measurement is carried down from the lot class, which creates a large amount of storage overhead for each test measurement.

Another conventional approach is the 100% relational approach which uses relational database technology and stores collections of data values as columns in tables. This technique uses meta-data tables to describe the columns in the data tables, which have generic names.

However, there are several problems with the conventional relational approach. First, the database is difficult to change, for example, if the nature of the incoming data exceeds the capabilities of the tables. Secondly, such a conventional system is very inefficient. A table that has 100 columns must use all 100 columns to be space efficient. If rows are created that do not use all data columns, as is typical in the semiconductor environment, then space is being wasted. The conventional relational approach also does not have any capability to distribute the data across multiple databases on multiple physical systems.

SUMMARY OF THE INVENTION

It is, therefore, an object of the present invention to provide a structure and method for storing chip data in database (e.g., DB2) tables as Binary Large Objects (BLOB's) and maintaining descriptive information of the BLOB (meta-data) in separated tables in the database. The meta-data describes the sequence of test parameters in a BLOB for a particular collection of tests performed on a particular device tested.

More specifically, the invention comprises an automated data processing system including a relational database engine storage devices having a database table, registry and binary large objects created and updated by the relational database engine and a user defined function engine retrieving data elements stored in the binary large objects. The registry includes data element classifications. The database table includes relational information of the data elements, the data element classifications and pointers to the binary large objects, and the relational database engine creates and updates the binary large objects based on the database table and the registry.

The binary large objects may comprise aggregate objects having a plurality of similar data elements or composite objects having a plurality of dissimilar data elements. The binary large objects have distinctive sizes based on corresponding ones of the data elements and the data element classification includes these distinctive sizes.

The database table has a current structure and the system is dynamically extended by defining additional data element classifications or by expanding a size of at least one of the binary large objects and maintaining the current structure of the database table.

The processing system may be a distributed network and the storage device would then be a plurality of network servers. Such a distributed network could include a data director for routing data elements and user requests.

The invention also includes a manual and computer implemented method of organizing data elements in a relational database, comprising storing relational information about the data elements and data element classification in a database table, defining the classification information in a registry, storing the data elements separate from the database table and the registry in objects; and including pointers to the objects in the database table.

In another embodiment, the invention comprises a relational database management system having objects storing data elements, a database table storing relational information of the data elements and pointers pointing to the objects (the database table does not include the data elements), and a registry having information about data element classification and data element location.

The invention supports multiple collections of test data, maintains descriptive information for data collections and does not use table columns to store test data. For example, the invention stores chip data in DB2 tables as Binary Large Objects (BLOB's) and maintains descriptive information (meta-data) in separate tables in the database. Additionally, the invention includes a small database footprint and is dynamically extendable without any database table structure changes. With the invention, the database maintenance is reduced while storage is optimized. Any data type, including those beyond the scope of data base management systems (DBMS), can be stored and retrieved with the invention and the database table cardinality is reduced.

The invention is especially useful in environments which involve a large number of diverse products. The invention permits rapid deployment in new areas without having to change the structure of the database.

BRIEF DESCRIPTION OF THE DRAWINGS

The foregoing and other objects, aspects and advantages will be better understood from the following detailed description of a preferred embodiment of the invention with reference to the drawings, in which:

FIG. 3A is a schematic diagram of an aggregate binary large object;

FIGS. 3B and 3C are schematic diagrams of a composite binary large object;

FIG. 4A is a schematic diagram of a record definition table;

FIG. 4B is a schematic diagram of a record type definition table;

FIG. 4C is a schematic diagram of a vector of 2000 floating point values;

DETAILED DESCRIPTION OF PREFERRED EMBODIMENTS OF THE INVENTION

Figures 1, 2A, 2B:
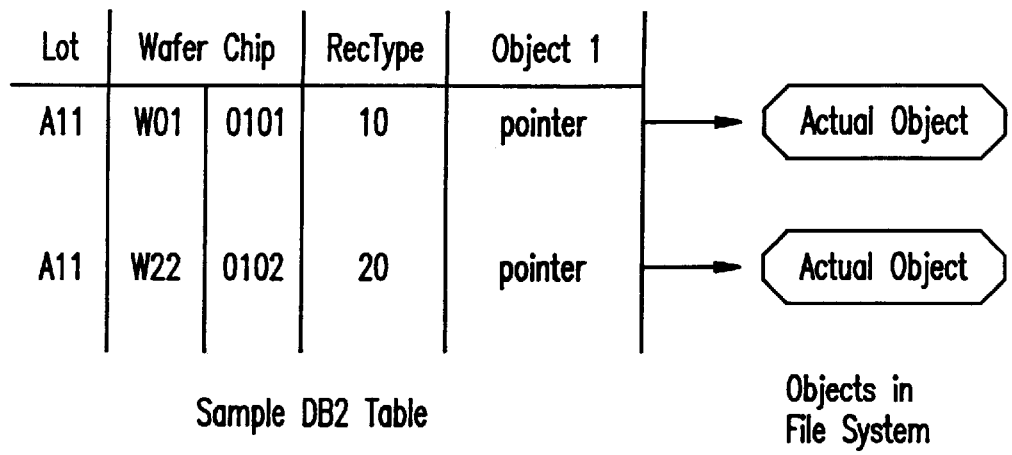
FIG. 1 is a schematic diagram of a sample DB2 table.
FIGS. 2A and 2B are schematic diagrams of registry tables.

Referring now to the drawings and more particularly to FIG. 1, a sample DB2 table utilizing an inventive Binary Large Object structure (sometimes referred to herein as "BLOB" or "object") is illustrated. The BLOBs extend the conventional relational model discussed above by acting as pure data columns. Unlike conventional columns, the BLOBs do not have any specific size or data type and each BLOB within a given database can have a different size. These columns (or BLOBs) can be of any length, up to an installation maximum size, and, as far as the database manager is concerned, have no form or organization. Thus, with the invention, the database software can determine the structure of the BLOBs for maximum efficiency.

More specifically, the table in FIG. 1 identifies aspects of a semiconductor manufacturing process including the lot identification (Lot), the wafer identification (Wafer) and chip identification (Chip). Further, the table in FIG. 1, identifies the type of record (RecType) maintained within the BLOB and includes a pointer (Object 1) to the BLOB (Actual Object).

To give form to the BLOBs in the database, a series of tables, called the registry, are provided. The registry comprises tables that define characteristics about the BLOB and the records within the BLOB.

Two exemplary tables which may be included in a given registry are shown in FIGS. 2A and 2B. These tables could include, for example, the record type(s) (RecType) maintained within a given BLOB, the length of the data elements of a given record type (ElementLength), the maximum number of data elements (MaxElements) which can be included in a given BLOB (which is determined from the size of the BLOB and the size and number of the data elements within the BLOB), the position of a given data element within a BLOB (Position) and the name of the data elements (ElementName) in the BLOB. Additionally, the registry identification (Regid) indicates which registry table maintains the information to decipher the binary large objects. Further, the registry version (RegVers) insures that the proper version of a given registry is utilized.

Figure 6:
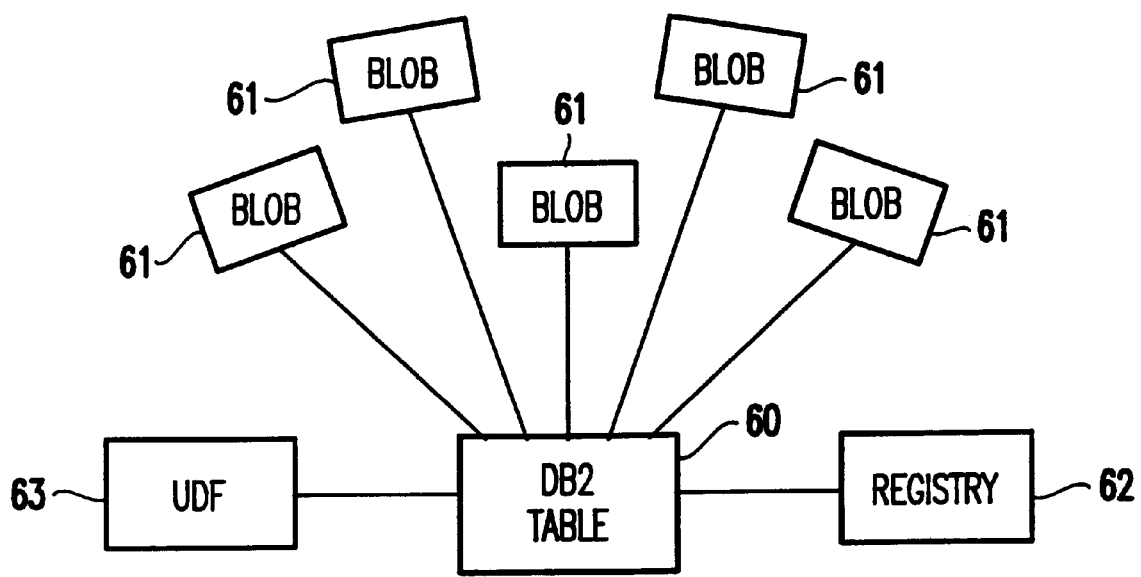
FIG. 6 is a conceptual model of binary large objects.

FIG. 6 illustrates a conceptual model of the binary large objects 61 and their logical connections to a DB2 table 60. The DB2 table 60 is also logically connected to the registry 62 and to a program utilizing user defined functions 63. As discussed in more detailed below, the DB2 table refers to the data classifications (e.g., data types) contained within the tables of the registry 62 when storing data elements within the binary large objects 61. Similarly, the user defined function program 63 works through the DB2 table 60 and the registry 62 when retrieving data elements from the binary large objects 61.

In order to increase efficiency, the BLOBs preferably only contain data and do not contain header, indexing or addressing information. Instead, such header information is contained within the tables of the registry. Therefore, the BLOBs are 100% efficient in that the entire BLOB is used simply for holding data.

In the example shown in FIG. 1, information regarding lot A11 includes information on a number of wafers including wafers W01 and W22. Wafer W01 includes a number of chips including chip 0101, which has a record type identified as 10. As shown in FIG. 2B, record type 10 could have an element length of 4 and a maximum number of elements of 500. To the contrary, record type 20 could have an element length of 2 and a maximum of 10 elements. For example, record type 10 could be applicable to floating point values, while record type 20 could be applicable to short integers.

The database can be dynamically expanded without affecting the structure of the DB2 table by defining new record types (classifications) and/or expanding the size of one or more of the BLOBs. This expansion or extension of the fundamental database structure does not affect the efficiency of the DB2 table because it is always completely (100%) utilized (e.g., each row within each column of the DB2 and registry tables are fully used).

The table shown in FIG. 2A is a portion of the registry and identifies the relative position within a given BLOB of a specific data value. Such a table is referred to for locating any element within a given BLOB.

Any number of BLOB types can be defined. While, a specific location within a BLOB is atomic (e.g., only one data type can be represented at a specific location within a BLOB), compositions of differing types of data (e.g., integers and floating point values) can be combined within the same BLOB.

An important advantage of the invention is that any type of information can be included in the BLOB. For example, the data types are not limited to standard database formats such as strings, floating point values and integers, but instead can include such items as audio, video, collections of measurements, text files or any other possible data type.

Thus the, registry provides an extensible data model. New data types can be dynamically defined and stored at any time by updating the registry tables. Further, no database table structure changes are required for such a change.

For a given record type, the individual elements of the objects are addressed by the element length, position, and name fields in the registry. With all of this information about the BLOB, any data element in any BLOB (e.g., column) can be referenced.

To find an element of interest in a BLOB, the BLOB is located using the pointer, the registry is queried to extract the number of bytes (e.g., Element Length) in each element of the BLOB, and each element position within the BLOB. The BLOB is linear with $1^{st}$ $2^{nd}$, $3^{rd}$, etc. elements. Alternatively, a BLOB could be a collection of pointers to other objects outside the database system. For example, a given BLOB could be a catalog of images stored on a storage subsystem.

With these two values (e.g., element length and element position) the offset into a specific BLOB is calculated. The data value of interest is located at the byte offset, and its length is known from the registry.

To insert data into a BLOB, the registry is first checked to ensure that the record type (RecType) of the incoming data is valid, and that the length of the incoming record is not longer than the accepted maximum length (MaxElements) for that type of BLOB. Optionally, the invention can allow records longer than specified in the registry. In such a situation, the registry is updated to include this excess area before the data is inserted. Once all verification is done, the record is inserted into the BLOB as it would have been conventionally inserted into a column. This highlights the invention's ability to modify the database structure at any time.

Selecting from a BLOB table is a two-step process. First the BLOB is located using the keys (e.g., pointer) in the DB2 table. Then, the position of the data within the BLOB is determined by reading the registry. Thus, the database table is all that is necessary at this point to find the byte offset into the BLOB.

When the position information is known, a Structured Query Language (SQL) statement is submitted. The SQL calls a User Defined Function (UDF) which takes the information from the registry and extracts the data value from the BLOBs which meet the clause in the SQL statement (e.g., common statements include: SELECT LOT, WAFER, CHIP, GET FLOAT-UDF (OBJECT 1, ELEMENT 10) WHERE RECTYPE=10 AND LOT='ALL').

The UDF is written by the software providers to support retrieving data from BLOBs in the SQL language. Elements from the BLOB's are returned as a column result set in response to the query.

FIG. 3A illustrates an aggregate BLOB. The concept of the aggregation involves melding many small records being sent to the database into a single BLOB in the database. The end user does not want to be concerned with the individual records being sent to the database, but only the collection of the records as a single entity. In this embodiment all sub-records of an aggregate BLOB should be of the same type. The non-aggregate BLOB discussed above is akin to a single entry in a column (or a single column) while an aggregate BLOB is akin to a complete column (or multiple columns).

More specifically, the table in FIG. 3A illustrates a sub-record type (SRecType), the base record type for the BLOB (RecType), a starting position (StartPosition) and a length (Length) for each of the individual sub-records. In the example shown in FIG. 3A, sub-record type 41 begins at position 1 and runs through position 50, sub-record type 42 begins at position 51 and ends at position 61, and sub-record type 43 begins that position 62 and ends at position 161. All of sub-records 41–43 within a given binary large object are the same type of data (e.g., all are integers, strings or floating point values).

The inventive concept of an aggregate object is a collection of test data records (that would normally be stored as separate objects, but which are logically looked at together by the user) into a single object. This aggregate record is defined in the registry tables, and looks from the perspective of retrieval, like one complete object.

Along with aggregate objects, which "aggregate" subjects of similar type into a single object, a composite object can be created which is a collection of dissimilar objects into a single physical object. A composite object has the same formless appearance as a regular or aggregate object, but is composed of sub-objects that can have differing data types. The registry of the invention supports the composite records without any additional tables.

FIGS. 3B and 3C illustrate registries relating to a composite binary large object that contains multiple elements of different types. There are three separate element groups (A,B,C) which are of different types. Group A is a collection of 4 byte integer values. There are 25 group A values. The second group, group B, is a character string 2000 bytes in length. The last group, group C, is a vector of 2000 floating point values, each of which is 4 bytes in length. The composite binary large object shown in FIG. 3B is similar to the aggregate binary large object shown in FIG. 3A, except that the composite binary object has different types of data, while the aggregate binary object includes the same type of data.

Composite objects represent the ultimate in flexibility in the design, further enhancing the invention's ability to reduce space usage in the database, reducing the cardinality of the data tables, and providing intricate mapping of highly complex and vastly large objects.

FIGS. 4A–4C illustrate record definition (RecDef) tables of a composite BLOB which includes three groups (e.g. three RecTypes). This portion of the registry includes the names (ElementName) assigned to pertinent data elements in the BLOB and the position (Position) of the elements within each BLOB. FIG. 4B defines the element length, maximum elements and description for each record type. FIG. 4C similarly defines the element length and maximum elements for a given record type.

A particular type of record (30) could be, for example, a character string that has a fixed element length of 2000 characters. The inventive mapping (e.g., registry) allows the retrieval of this entire string into an application program. An alternative method of defining record type 30 is shown in FIG. 4C. The individual characters of the string can be given names using this alternative method to allow full mapping of the entire string. These two cases represent the boundary conditions of the string type, and any collection of lengths can be constructed to map the 2000 characters of the string, depending on the how granularly the data needs to be addressed.

Figure 5:
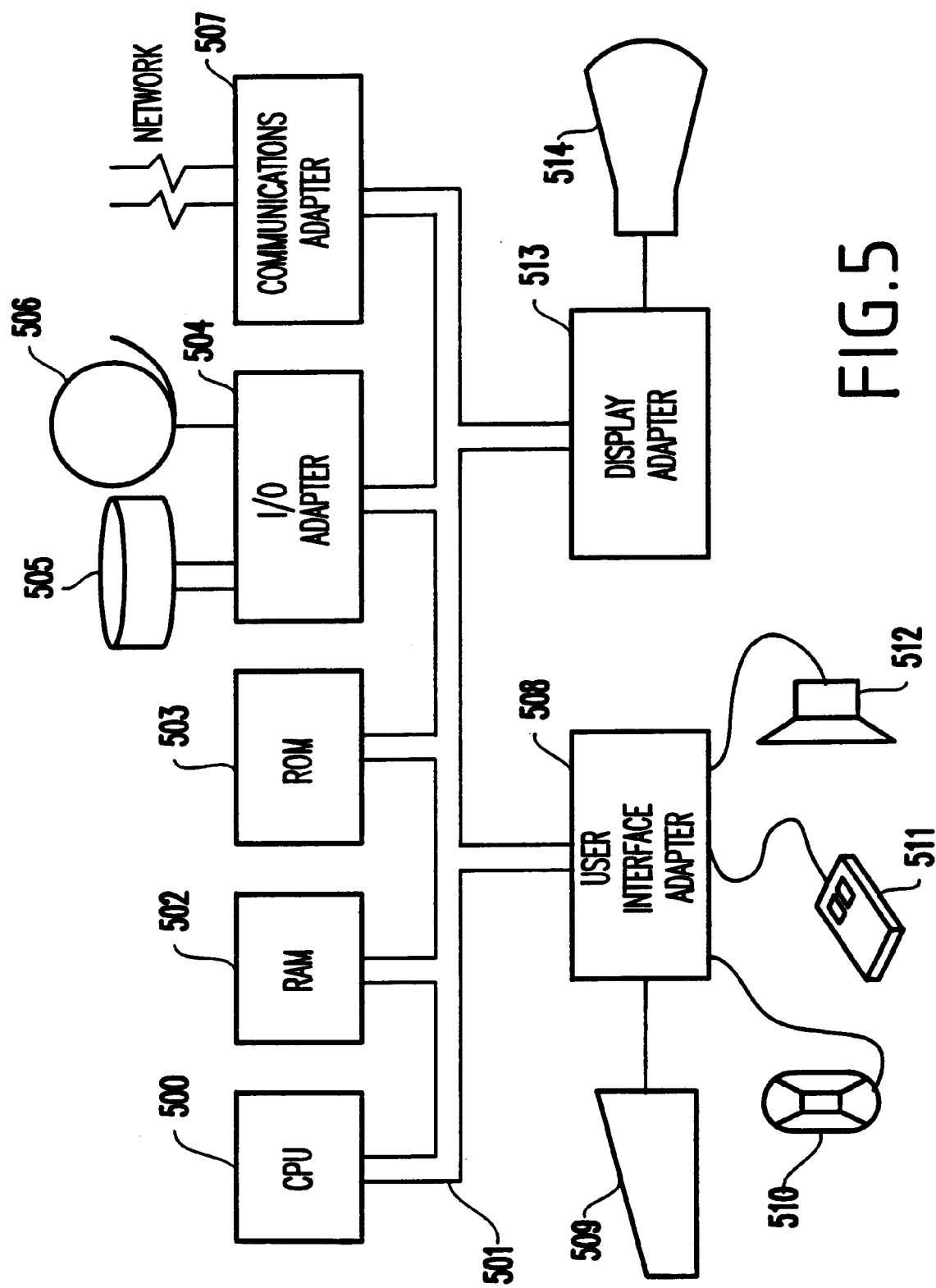
FIG. 5 is a flowchart illustrating a preferred embodiment of the invention.

A typical hardware configuration of an information handling/computer system in accordance with the invention is illustrated in FIG. 5. The inventive system preferably has at least one processor or central processing unit (CPU) 500. The CPU 500 is interconnected via a system bus 501 to a random access memory (RAM) 502, read-only memory (ROM) 503, input/output (I/O) adapter 504 (for connecting peripheral devices such as disk units 505 and tape drives 506 to the bus 501), communication adapter 507 (for connecting an information handling system to a data processing network) user interface adapter 508 (for connecting a keyboard 509, microphone 510, mouse 511, speaker 512 and/or other user interface device to the bus 501), and display adapter 513 (for connecting the bus 501 to a display device 514).

Figure 7:
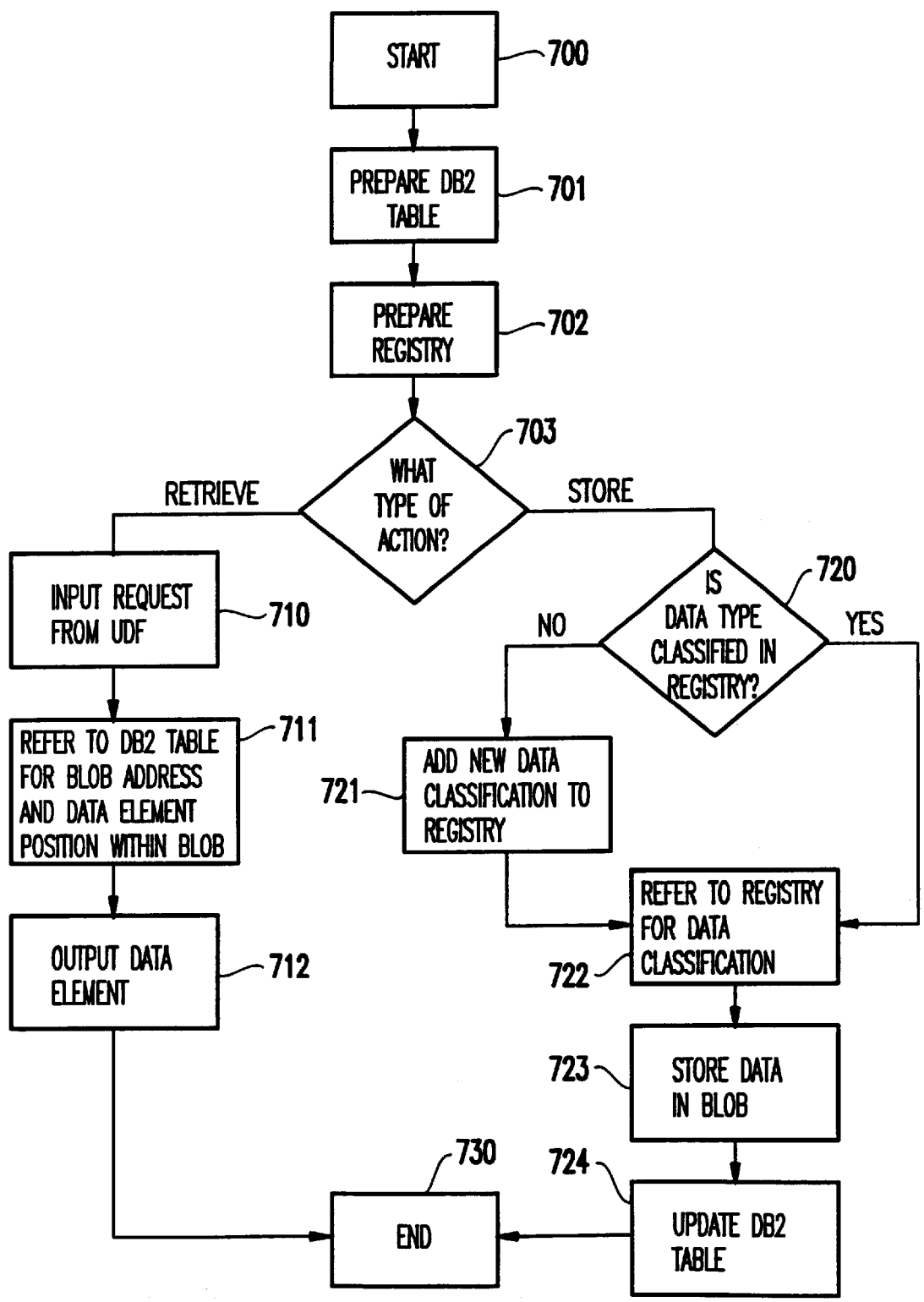
FIG. 7 is a flowchart illustrating a preferred embodiment of the invention.

FIG. 7 summarizes some of the operations of the invention. More specifically, in blocks 701 and 702 the DB2 table and registry are prepared. If data is to be stored, block 703 directs the processing to block 720 where the data is compared with existing data classifications in the registry. If the data type or classification is not found in the registry, a new classification is added in block 721. Processing then moves to block 722 where the registry is referred to for data classification. The data is stored in binary large objects and the DB2 table is updated in blocks 723 and 724.

If the decision block 703 determines that a retrieval is to occur, the request is processed through the user defined function program in blocks 710. Then the DB2 table is used to determine the BLOB address and the position of the data elements in block 711. In block 712 the data is output either directly to the user or to some other program as determined by the user.

The ability to distribute data among N databases on M machines (which is a distribution of data among a network of systems) is also supported in the invention. With the invention, a series of tables can be used to define criteria for routing incoming data to an appropriate database. These same tables provide a master index of all data in the network for user retrievals. This allows the user to find the data without submitting queries against all N databases in the network.

Figure 8:
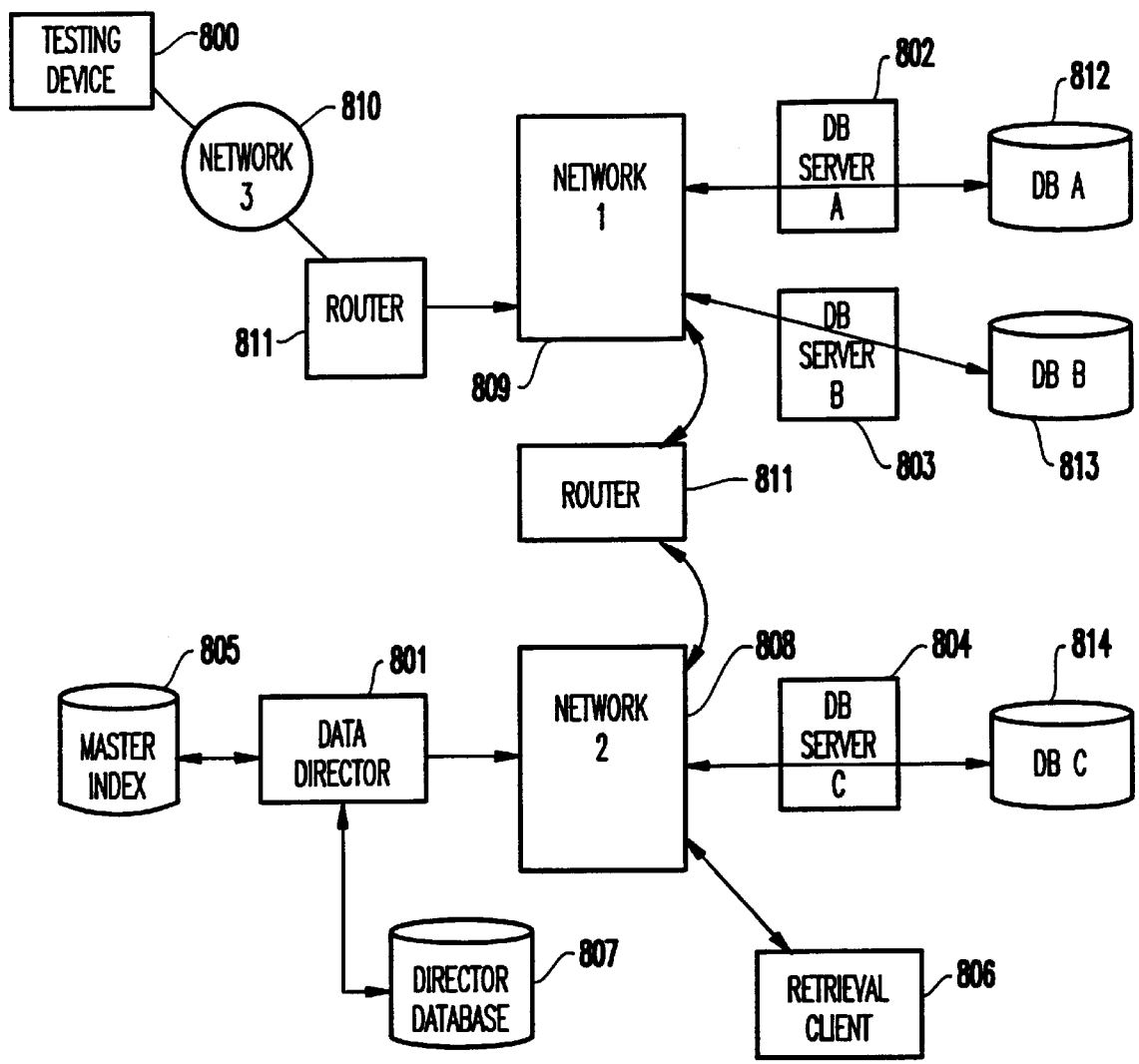
FIG. 8 is a conceptual model of a network utilizing the invention.

FIG. 8 illustrates such a data distribution and retrieval network that includes a testing device 800, a data director 801, director database 807, database servers A–C (802–804), a master index 805, retrieval client 806, networks 808–810, routers 811 and databases A–C (812–814).

The testing device 800 communicates with the data director 801 and the data director 801 replies to the testing device 800 with a location (e.g., database server 802, 803, or 804) where the data should be sent. The testing device 800 terminates conversation with the data director 801 and connects with the target database server 802, 803, or 804 and transmits the test data. The data can be stored in the target database server using the inventive BLOBs. The registry can be located in a location which satisfies the networks requirements, such as the individual target database servers 802, 803 or 804 or the data director 801.

To find data, a retrieval client 806 sends a query to the data director 801 which then sends a query to the master index 805. A target database server 802, 803, or 804 is found by the data director 801 using the master index 805 and the target database server information is returned to the retrieval client 806. The retrieval client 806 then terminates its connection with the data director 801 and opens a connection with the target database server 802, 803, or 804, and sends the data request. Once again, the data can be retrieved from the database server using the inventive BLOBs and registry. The data is then returned to retrieval client 806.

Since the BLOBs are not burdened with header or indexing information, the database is extremely efficient and does not waste valuable storage space as conventional database systems do.

With the present invention, both object-oriented and relational technologies are used in the same database and meta-data tables are used to define the binary large objects containing the data elements. This technology is referred to herein as extended-relational, or object-relational technology. This invention creates a hybrid database of relational data with nested objects for collections of data values and uses relational tables as a support structure for the objects. This technique provides a better method to access the data, capitalizing on the Structured Query Language.

In the conventional object-oriented approach, specialized programs are required to create, update, read and delete objects. However, by using a DB2 relational database, the invention eliminates the need for special code to create, insert, and delete rows in tables containing objects. While some code is required to read and update objects (since SQL provides no native functions to interpret the contents of the objects), by utilizing User Defined Functions (UDFs) in the process of extracting parts of objects, the invention does not require a significant amount of programming.

The invention minimizes meta-data tables, which reduces the number of tables required to store test data in a highly heterogeneous product environment, and minimizes the complexity of tables by storing the large collections of test data in binary large objects and defining the structure of, and location of the data within, the binary large objects in a separate table.

With conventional systems, classification (e.g., size, type, name) and other information is recorded within the table where the data elements are stored. With the invention, such classification information is abstracted, removed from the data element storage units (e.g., the binary large objects), and stored in the registry. This saves space in the tables and make the database generally simpler.

The invention supports multiple collections of test data, maintains descriptive information for data collections and does not use table columns to store test data. For example, the invention stores chip data in DB2 tables as Binary Large Objects (BLOB's) and maintains descriptive information (meta-data) in separate tables in the database. Additionally, the invention includes a small database footprint and is dynamically extendable without any database table structure changes. With the invention, the database maintenance is reduced while storage is optimized. Any data type, including those beyond the scope of data base management systems (DBMS), can be stored and retrieved with the invention and the database table cardinality is reduced.

The invention is especially useful in environments which involve a large number of diverse products. The invention permits rapid deployment in new areas without having to change the structure of the database.

While the invention has been described in terms of preferred embodiments, those skilled in the art will recognize that the invention can be practiced with modification within the spirit and scope of the appended claims.

What is claimed is:

1. An automated data processing system comprising:
   a relational database engine;
   at least one storage device including a database table, retisry and a data object consisting of at least one binary large object created and updated by said relational database engine, wherein said binary large objects only contain data and are devoid of header, indexing and addressing information; and
   a user-defined function engine retrieving at least one data element stored in said at least one binary large object,
   said registry including data element classifications,
   said database table including relational information of said at least one data element, said data element classifications and pointers to said at least one binary large object, said relational database engine creating and updating said at least one binary large object based on said database table and said registry;

said database table having a current structure; and said system being dynamically extended by expanding a size of at least one of said at least one binary large object and maintaining said current structure of said database table.

2. The system in claim 1, wherein said binary large object comprises an aggregate object having a plurality of similar data elements.

3. The system in claim 1, wherein said binary large object comprises a composite object having a plurality of dissimilar data elements.

4. The system in claim 1, wherein said at least one binary large object have distinctive sizes based on corresponding ones of said at least one data element.

5. The system in claim 4, wherein said data element classification includes said distinctive sizes.

6. The system in claim 1, wherein said database table has a current structure, said system being dynamically extended by defining additional data element classifications and maintaining said current structure of said database table.

7. The system in claim 1, wherein said system comprises a distributed network and said storage device comprises a plurality of network servers, said distributed network including a data director for routing said at least one data element and user requests.

8. A method of organizing data elements in a relational database, said method comprising:

storing relational information about said data elements and data element classifications in a database table;

defining said data element classifications in a registry;

storing said data elements in objects separate from said database table and said registry, wherein said objects only contain data and are devoid of header, indexing and addressing information; wherein said objects consist of at least one binary large object created and updated by a relational database engine; and including pointers to said objects in said database table;

wherein said database table has a current structure, and said method further comprises dynamically extending said relational database by expanding a size of at least one of said at least one binary large object and maintaining said current suture of said database table.

9. The method in claim 8, wherein said storing of said data elements comprises storing said data elements as aggregate objects having a plurality of similar data elements.

10. The method in claim 8, wherein said storing of said data elements comprises storing said data elements as composite objects having a plurality of dissimilar data elements.

11. The method in claim 8, further comprising forming said objects to have distinctive sizes based on corresponding sizes of said data elements.

12. The method in claim 11, further comprising storing said distinctive sizes in said registry.

13. The method in claim 8, wherein said database table has a current structure, said method further comprising dynamically extending said relational database by defining additional data element classifications and maintaining said current structure of said database table.

14. A relational database management system comprising:

at least one object storing at least one data element, wherein said object only contain data and is devoid of header, indexing and addressing information, wherein sad object consists of at least one binary large object created and updated by said relational engine;

a database table storing relational information of said data element and at least one pointer to said at least one object said database table lacking said data element; and a registry having information about data element classification and data element location;

wherein said database table has a current suture, and wherein said system is dynamically extended by expanding a size of at least one of said at least one binary large object and maintaining said current structure of said database table.

15. The system in claim 14, wherein said object comprises an aggregate object storing a plurality of similar data elements.

16. The system in claim 14, wherein said object comprises a composite object storing a plurality of dissimilar data elements.

17. The system in claim 14, wherein said at least one object have distinctive sizes based on corresponding ones of said at least one data element.

18. The system in claim 17, wherein said data element classification includes said distinctive sizes.

19. The system in claim 14, wherein said database table has a current structure, said system being dynamically extended by defining additional data element classifications and maintaining said current structure of said database table.

20. The system in claim 14, wherein said system comprises a distributed network having a plurality of network servers and a data director for routing said data element and user requests.

21. A program storage device readable by machine, tangibly embodying a program of instructions executable by the machine to perform a method for organizing data elements in a relational database, said method comprising:

storing relational information about said data elements and data element classifications in a database table;

defining said data element classifications in a registry;

storing said data elements in objects separate from said database table and said regist, wherein said objects only contain data and are devoid of header, indexing and addressing information; wherein said objects consist of at least one binary large object created and updated by a reladonal database engine; and including pointers to said objects in said database table;

wherein said database table has a current structure, and said method further comprises dynamically extending said realational database by expanding a size of at least one of said at least one binary large object and maintaining said current structure of said database table.

22. The program storage device in claim 21, wherein said storing of said data elements comprises storing said data elements as aggregate objects having a plurality of similar data elements.

23. The program storage device in claim 21, wherein said storing of said data elements comprises storing said data elements as composite objects having a plurality of dissimilar data elements.

24. The program storage device in claim 21, wherein said method further comprises forming said objects to have distinctive sizes based on corresponding sizes of said data elements.

25. The program storage device in claim 24, wherein said method further comprises storing said distinctive sizes in said registry.

26. The program storage device in claim 21, wherein said database table has a current structure, said method further comprising dynamically extending said relational database by defining additional data element classifications and maintaining said current structure of said database table.

* * * * *